(12) United States Patent
Saito

(10) Patent No.: US 8,941,765 B2
(45) Date of Patent: Jan. 27, 2015

(54) IMAGING DEVICE

(71) Applicant: Olympus Corporation, Tokyo (JP)

(72) Inventor: Masashi Saito, Tokyo (JP)

(73) Assignee: Olympus Corporation, Tokyo (JP)

( * ) Notice: Subject to any disclaimer, the term of this patent is extended or adjusted under 35 U.S.C. 154(b) by 91 days.

(21) Appl. No.: 13/848,450

(22) Filed: Mar. 21, 2013

(65) Prior Publication Data

US 2013/0250152 A1    Sep. 26, 2013

(30) Foreign Application Priority Data

Mar. 22, 2012  (JP) ................................. 2012-066152

(51) Int. Cl.
| | |
|---|---|
| H04N 3/14 | (2006.01) |
| H04N 5/228 | (2006.01) |
| H03M 1/00 | (2006.01) |
| H01L 27/00 | (2006.01) |
| H04N 5/374 | (2011.01) |
| H04N 5/357 | (2011.01) |
| H04N 5/378 | (2011.01) |

(52) U.S. Cl.
CPC ............... H04N 5/374 (2013.01); H04N 5/357 (2013.01); H04N 5/378 (2013.01)
USPC ........... 348/308; 348/294; 348/241; 341/126; 250/208.1; 257/159

(58) Field of Classification Search
CPC ......... H04N 3/14; H04N 5/228; H04N 5/217; H03M 1/00; H01L 27/00
USPC ............... 348/308, 294, 222.1, 241, 236.6; 341/126, 155, 169; 250/208.1; 257/159
See application file for complete search history.

(56) References Cited

U.S. PATENT DOCUMENTS

| | | | |
|---|---|---|---|
| 2009/0040352 A1* | 2/2009 | Kawaguchi | 348/308 |
| 2010/0090994 A1* | 4/2010 | Tanaka et al. | 345/204 |
| 2011/0194003 A1* | 8/2011 | Saito | 348/294 |
| 2012/0120290 A1* | 5/2012 | Kim | 348/294 |
| 2013/0120622 A1* | 5/2013 | Hiraoka et al. | 348/294 |

FOREIGN PATENT DOCUMENTS

JP          2008-092091 A       4/2008

* cited by examiner

*Primary Examiner* — Tuan Ho
*Assistant Examiner* — Marly Camargo
(74) *Attorney, Agent, or Firm* — Westerman, Hattori, Daniels & Adrian, LLP

(57) ABSTRACT

An imaging device includes a plurality of first pixels, each of which outputs a first pixel signal, a plurality of second pixels, each of which outputs a second pixel signal, a ramp wave generator that outputs a ramp signal that monotonously increases or monotonously decreases over time, a phase shift pulse generator that outputs first to n-th phase shift pulse signals, a first pixel latch group that latches the first to n-th phase shift pulse signals when the first pixel signal and the ramp signal have a predetermined relationship, a second pixel latch group that latches the first to n-th phase shift pulse signals when the second pixel signal and the ramp signal have the predetermined relationship, first to n-th power source lines to supply a power source and first to n-th phase shift pulse supply lines to supply the phase shift pulses.

4 Claims, 6 Drawing Sheets

IMAGING DEVICE

BACKGROUND OF THE INVENTION

1. Field of the Invention

The present invention relates to an imaging device.

Priority is claimed on Japanese Patent Application No. 2012-066152, filed Mar. 22, 2012, the content of which is incorporated herein by reference.

2. Description of Related Art

In recent years, an imaging device represented by a charge coupled device image sensor (hereinafter referred to as the CCD), and a complementary metal oxide semiconductor image sensor (hereinafter referred to as the CMOS) has been installed in an image device represented by a digital still camera, a camcorder, and an endoscope. The imaging devices have gained popularity at home and abroad, and a demand for a further decrease in size and for low power consumption has been high.

Among the CMOS's, the so-called column A/D type imaging device with an A/D conversion function integrated into a column unit has been developed and commercialized. A single slope A/D conversion method, one of the embedded A/D conversion functions, is to compare a reference signal (a ramp wave), which changes monotonously for conversion to a digital signal, with an analog pixel signal, to perform count processing in parallel to the comparison processing, and to obtain the digital signal for a pixel signal based on a count value at the time of completion of the comparison processing.

Particularly, an imaging device is known, which includes a count unit that has multiple delay units, each with the same configuration, generates a low order phase shift CLK using a ring oscillator and the like that starts a transition operation at a timing relating to starting of the comparison processing, and counts pulses from a ring oscillator, a low order latch unit that latches low order logical states, which are logical states of the multiple delay units, at a first timing relating to ending of the comparison processing, and a high order latch unit that latches high order logical states, which are the logical states of the count units, at the first timing relating to the ending of the comparison processing. The imaging device computes a digital signal that depends on an analog signal, based on data obtained by the low order latch unit and the high order latch unit, and perform an A/D conversion (for example, Japanese Unexamined Patent Applications, First Publication No. 2008-92091).

However, in such a case where an A/D conversion circuit is arranged in every multiple pixel (for example, the A/D conversion circuit is arranged in every pixel column), several hundreds to several thousands of A/D conversion circuits have to be arranged at intervals of several µm. Because in this case wiring space is increased, a power source and a GND can not be divided to provide wiring in every A/D conversion circuit. For this reason, the wiring needs to be provided in such a manner that all of the A/D conversion circuits are connected to a common power source and a common GND.

FIG. 5 is a block diagram illustrating an outline of a configuration of the imaging device that has a single slope A/D conversion circuit, known in the related art. In an example illustrated, an imaging device 200 includes an imaging unit 100 of multiple pixels P, the single slope A/D conversion circuit, a reference signal source 101, a horizontal line selection circuit 102, and an output line 109. Furthermore, the single slope A/D conversion circuit includes a ramp wave generator 104, a phase frequency comparator 106, a ring oscillator 107, comparators 103a to 103c, counters 105a to 105c, and latch decode circuits 108a to 108c, each made from a latch circuit and a decode circuit.

Next, operations of the imaging device 200 is described that has the single slope A/D conversion circuit. First, a pixel signal that a pixel P outputs in response to an amount of incident light, and the ramp wave that the ramp wave generator 104 outputs in response to a signal from the reference signal source 101 are input to the comparators 103a to 103c. At the same time, the phase frequency comparator 106 and the ring oscillator 107 generate a count pulse and a pulse that is shifted by $\pi/8$ in phase from the count pulse, in response to the signal from the reference signal source 101. The counters 105a to 105c are synchronized with the count pulse from the ring oscillator 107, and starts to count from an initial value thereof. Furthermore, the pulse that is shifted by $\pi/8$ in phase from the count value is input to the latch circuit within the latch decoders 108a to 108c.

When a magnitude relationship between two input signals, which are the pixel signal and the ramp wave that are input to the comparators 103a to 103c in a certain column, is changed, output signals from the comparators 103a to 103c are reversed, the counters 105a to 105c in that column maintain count values, the latch circuits of the latch decoders 108a to 108c in that column maintain states of the pulses, which are shifted by $\pi/8$ in phase from the count pulse, with their respective latch units. Subsequently, the pulses, maintained by the latch circuits of the latch decoders 108a to 108c, are supplied to the decode circuits, and are converted into numerical values in several bits (for example, 3 bits) according to the states of the maintained pulses. Thus, the pixel signal, output by the pixel P, may be A/D-converted.

FIG. 6 is a block diagram illustrating an outline of a configuration of an A/D conversion unit that is equipped with the single slope A/D conversion circuit that is known in the related art. As illustrated in FIG. 6, the counters 105a to 105j included in the A/D conversion circuit arranged in each column of the A/D conversion unit 300 have the same configurations as the latch decoders 108a to 108j. Furthermore, the operating electric current for the latch units of the latch circuits included in the latch decoder 108a to 108j flows when the pulse that is input is changed (for example, when the pulse is changed from high to low, or from low to high). For this reason, in a case where the same pulse is input to the multiple latch units, the electric current flows in the power source and the GND, which are commonly wired to the latch units to which the same pulse is input, at almost the same timing. Because of the electric current, a voltage drop occurs in resistance components of the input wiring and the GND wiring, and voltage levels of the power source and the GND of each latch unit are changed.

The imaging device that is used in a digital still camera (DSC) is considered as an example. Normally, the number of pixels of the digital still camera is one million or more. Here, the number of pixels of the digital still camera is assumed to be 20 million. For the purpose of conveniences for the descriptions, an aspect ratio in a 20 million pixel array is assumed to be 4000 rows×5000 columns. In a case where a readout of 60 frames per one second (60 frames/sec) is realized, a phase shift pulse and a counter pulse are approximately several hundred MHz. At this time, an amount of operating electric current for at least significant bit (LSB) of the latch unit and the counter ranges from 10 µA to 20 µA. In a case where one A/D conversion circuit is provided per one column, the amount of electric current flowing in all of the latch units that are horizontally in parallel is (10 µA to 20 µA)×5000 columns=50 mA to 100 mA.

It is likely that when a wiring resistance of the power source is set to 5 Ω, a fluctuation will be 0.5 V, and when a power source voltage is set to approximately 1.5 V, a power source potential and GND potential will be changed by approximately 30 to 40 percents and malfunction will occur in the latch decoders 108a to 108j and the counters 105a to 105j. Particularly, a fluctuation in the power source has a great influence on the counters 105a to 105j and the latch decoders 108a to 108j that are arranged in a column far away from a power supply that supplies the power source and the GND.

In this manner, in a case where the multiple A/D conversion circuits are connected to the common power source and the common GND, the voltage drop occurs in the resistance components of the input wiring and the GND wiring, and the voltage levels of the power source and the GND of each A/D conversion circuit are changed.

SUMMARY OF THE INVENTION

An aspect of the present invention is to provide an imaging device that is able to decrease fluctuations in power source and GND due to operation of an A/D conversion circuit in each column and to prevent fluctuations in an output value of each A/D conversion circuit also in a case where the A/D conversion circuit is installed in every column.

According to another aspect of the present invention, there is provided an imaging device including a plurality of first pixels, each of which outputs a first pixel signal which depends on an incident physical quantity, a plurality of second pixels, each of which outputs a second pixel signal which depends on the incident physical quantity, a ramp wave generator that outputs a ramp signal that monotonously increases or monotonously decreases over time, a phase shift pulse generator that outputs first to n-th phase shift pulse signals which differ from one another in phase in response to an input pulse signal, a first pixel latch group that latches the first to n-th phase shift pulse signals when the first pixel signal and the ramp signal have a predetermined relationship and that includes an alignment in row a plurality of first latches each of which includes an alignment in column of first to n-th first latch units, a second pixel latch group that latches the first to n-th phase shift pulse signals when the second pixel signal and the ramp signal have the predetermined relationship and that includes an alignment in row a plurality of second latches each of which includes an alignment in column of first to n-th second latch units, first to n-th power source lines to supply a power source and first to n-th phase shift pulse supply lines to supply the phase shift pulse signals, where the i-th power source line is to supply power to the i-th first latch units and the i-th second latch units, and the i-th phase shift pulse supply line is to supply the i-th phase shift pulse signal to the i-th first latch units and the j-th second latch units, and where n is a natural number greater than 1, i is a natural number equal to or greater than 1 and equal to or smaller than n, and j is a natural number equal to or greater than 1 and equal to or smaller than n, and different from i.

According to another aspect of the present invention, the imaging device may further include a first counter that counts either of the first to n-th phase shift pulse signals, a first high order bit latch that maintains an output of the first counter when the first pixel signal and the ramp signal have a predetermined relationship, a second counter that counts either of the first to n-th phase shift pulse signals, and a second high order bit latch that maintains an output of the second counter when the second pixel signal and the ramp signal have the predetermined relationship. In the image device, the first counter and the second counter are powered by the same power supply as that of the first to n-th power source lines.

According to another aspect of the present invention, the image device may further include a plurality of third pixels, each of which outputs a third pixel signal that depends on an incident physical quantity, a plurality of fourth pixels, each of which outputs a fourth pixel signal that depends on an incident physical quantity, a third pixel latch group that latches the first to n-th phase shift pulse signals when the third pixel signal and the ramp signal have a predetermined relationship and that includes an alignment in row a plurality of third latches each of which includes an alignment in column of first to n-th third latch unit, and a forth pixel latch group that latches the first to n-th phase shift pulse signals when the forth pixel signal and the ramp signal have the predetermined relationship and that includes an alignment in row a plurality of forth latches each of which includes an alignment in column of first to n-th forth latch units, where the i-th power source line is to supply power to the i-th third latch unit and the i-th forth latch unit, and the k-th phase shift pulse supply line is to supply the k-th phase shift pulse signal to the i-th third latch unit and the j-th forth latch unit, and where k is a natural number equal to or greater than 1, equal to or smaller than n, and different from i and j.

Furthermore, in the imaging device according to another aspect of the present invention, j may different from i by 1.

According to another aspect of the present invention, each of the multiple first pixels outputs the first pixel signal that depends on the incident physical quantity. Furthermore, each of the multiple second pixels outputs the second pixel signal that depends on the incident physical quantity. Furthermore, the ramp wave generator outputs the ramp signal that monotonously increases or monotonously decreases over time. Furthermore, the phase shift pulse generator outputs the first to n-th phase shift pulse signals that differ in phase from one another in response to the input pulse signal. Furthermore, the first pixel latch group latches the first to n-th phase shift pulse signals when the first pixel signal and the ramp signal have the predetermined relationship. The first pixel latch group includes an alignment in row a plurality of the first latches each of which includes an alignment in column of the first to n-th first latch units in the order of the first to the n-th. Furthermore, the second pixel latch group latches the first to n-th phase shift pulse signals when the second pixel signal and the ramp signal have the predetermined relationship. The second pixel latch group includes an alignment in row a plurality of the second latches each of which includes an alignment in column of the first to n-th second latch units in the order of the first to the n-th. Furthermore, the power source is supplied over the first to n-th power source lines. Furthermore, the phase shift pulses are supplied over the first to n-th phase shift pulse supply lines. Furthermore, the power source is supplied to the i-th first latch units and the i-th second latch units over the i-th power source line. Furthermore, the i-th phase shift pulse signal is supplied to the i-th first latch units and the j-th second latch units over the i-th phase shift pulse supply line. Furthermore, n is a natural number greater than 1. Furthermore, the i is a natural number equal to or greater than 1 and equal to or smaller than n. Furthermore, j is a natural number equal to or greater than 1 and equal to or smaller than n, and different from i.

Thus, since the timings of the changes in the phase shift pulse supplied over the i-th phase shift pulse supply line differ, also the timings when the electric current consumed in the first pixel latch group and the second pixel latch group flow differ. Therefore, also in a case where the A/D conversion circuit is installed in every column, fluctuations in the power source and the GND due to operation of the A/D conversion circuit in each column can be decreased and fluctuation in the output value of each A/D conversion circuit can be prevented.

DETAILED DESCRIPTION OF THE INVENTION

First Embodiment

Figure 1:
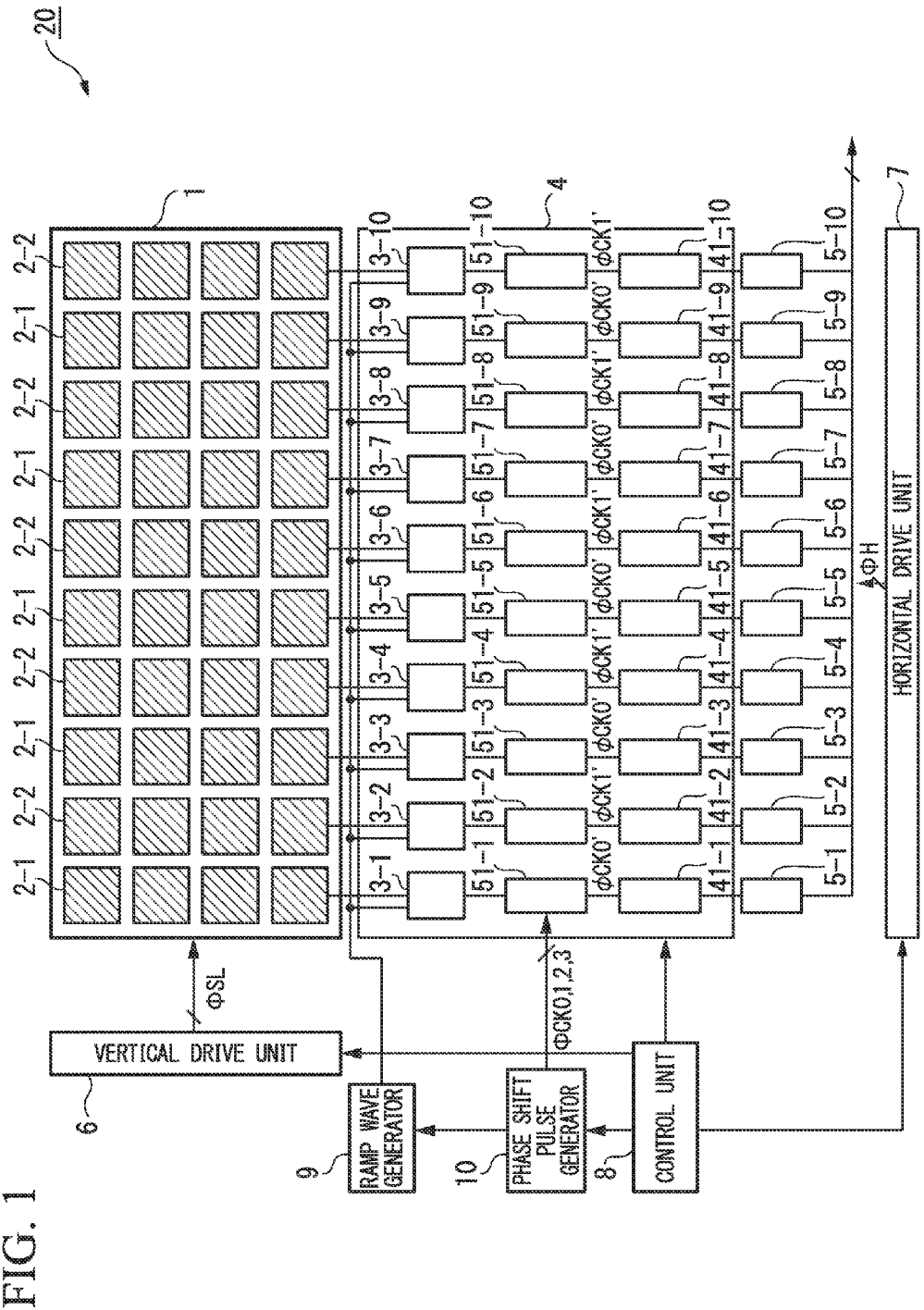
FIG. 1 is a block diagram illustrating an outline of a configuration of an imaging device according to a first embodiment of the present invention.

A first embodiment of the present invention is described below referring to the drawings. FIG. 1 is a block diagram illustrating an outline of a configuration of an imaging device according to the first embodiment. In an example as illustrated in FIG. 1, an imaging device 20 includes a pixel unit 1 in which multiple pixels 2 are arranged in rows and columns, a vertical drive unit 6, an A/D conversion unit 4, latch units 5-1 to 5-10, a horizontal drive unit 7, a control unit 8, a phase shift pulse generator 10 and a ramp wave generator 9.

The pixels 2 each output an analog signal that depends on an amount of incident light (a physical quantity). Among the pixels 2 that are arranged in rows and columns, the vertical drive unit 6 selects the pixels 2 outputting the signal, in every row. The ND conversion unit 4 includes multiple A/D conversion circuits, and converts an analog signal output by the pixel 2 into a digital signal (a digital pixel signal). Each A/D conversion circuit includes comparators 3-1 to 3-10, low order latches 51-1 to 51-10, and counters 41-1 to 41-10. The latch units 5-1 to 5-10 each maintain the digital pixel signal that results from conversion by the A/D conversion circuit included in the A/D conversion unit 4. The horizontal drive unit 7 sequentially outputs the digital pixel signals maintained by the latch units 5, to the outside, by changing a horizontal selection signal. The control unit 8 performs control of each component included in the imaging device 20.

The ramp wave generator 9 generates and outputs a ramp signal (a reference signal, and a ramp wave) that increases or decreases with time. The phase shift pulse generator 10 generates and outputs a phase shift pulse φCK0 (a first phase shift pulse), a phase shift pulse φCK1 (a second phase shift pulse), a phase shift pulse φCK2 (a third phase shift pulse), and a phase shift pulse φCK3 (a fourth phase shift pulse) that are shifted by π/8 in phase in response to a control signal from the control unit 8.

Moreover, among the pixels 2 that are arranged in the pixel unit 1, the pixels 2 that are arranged in the first, third, fifth, seventh, and ninth columns from left are defined as first pixels 2-1, and the pixels 2 that are arranged in the second, fourth, sixth, eighth, and tenth columns from left are defined as second pixels 2-2. Furthermore, the analog signals output by the first pixels 2-1 are defined as first pixel signals, and the analog signals output by the second pixels 2-2 are defined as second pixel signals.

Figure 2:
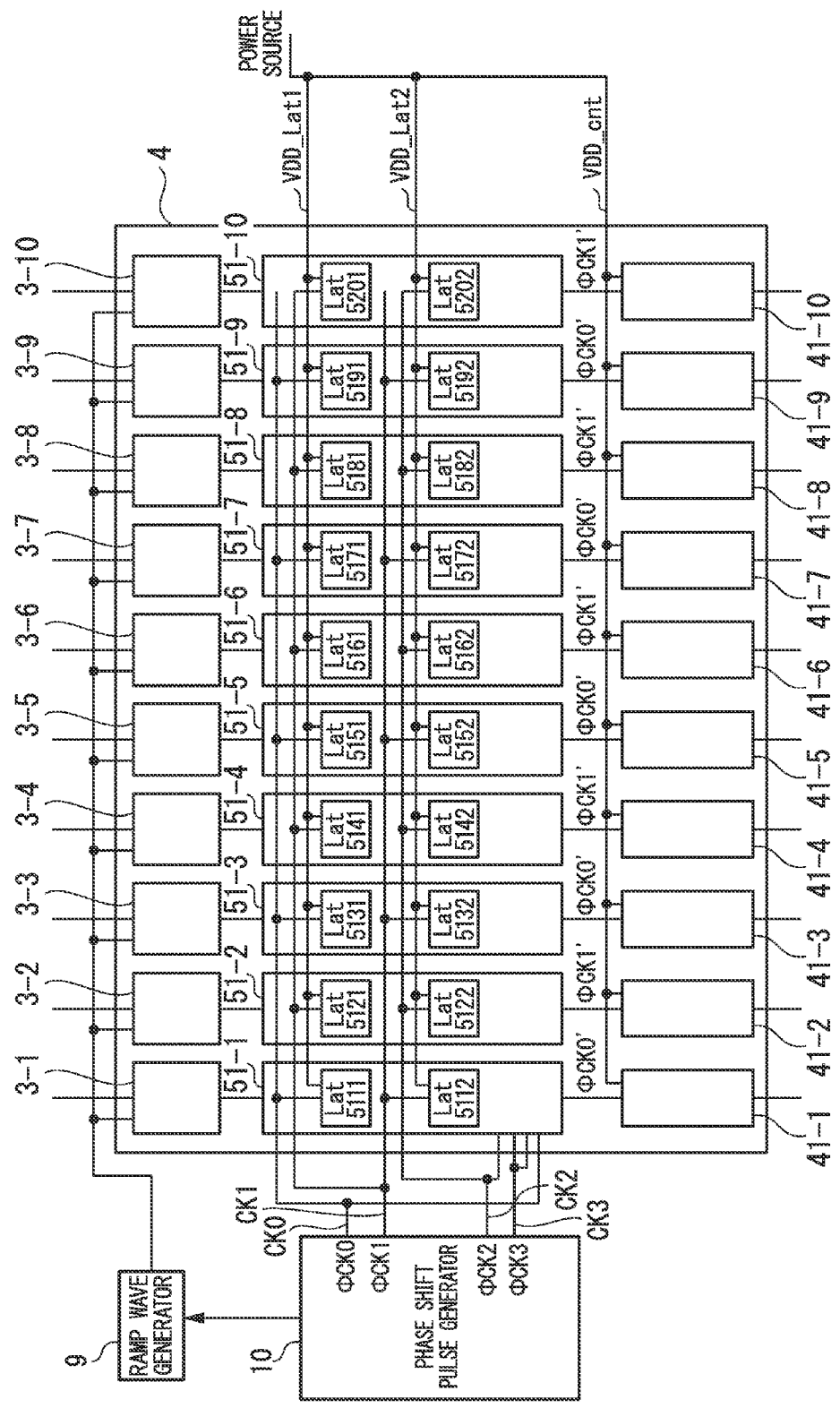
FIG. 2 is a block diagram illustrating configurations of an A/D conversion unit, a phase shift pulse generator and a ramp wave generator according to the first embodiment of the present invention.

FIG. 2 is a block diagram illustrating configurations of the A/D conversion unit 4, the phase shift pulse generator 10 and the ramp wave generator 9 that are included in the imaging device 20 illustrated in FIG. 1. In an example illustrated in FIG. 2, the A/D conversion unit 4 includes the comparators 3-1 to 3-10, the low order latches 51-1 to 51-10, and the counters 41-1 to 41-10 in every column of the pixels 2. The low order latch 51-1 includes first latch unit Lat5111 and second latch unit Lat5112. The low order latch 51-2 includes first latch unit Lat5121 and second latch unit Lat5122. Each of the low order latches 51-3 to 51-10 also includes two latch units. Moreover, the latch units included in the low order latches 51-3 to 51-10 are as illustrated in FIG. 2.

Furthermore, over a power source line VDD_Lat1, the power source is supplied to the first latch units Lat5111, Lat5121, Lat5131, Lat5141, Lat5151, Lat5161, Lat5171, Lat5181, Lat5191, and Lat5201. Furthermore, over a power source line VDD_Lat2, the power source is supplied to the second latch units Lat5112, Lat5122, Lat5132, Lat5142, Lat5152, Lat5162, Lat5172, Lat5182, Lat5192, and Lat5202. Furthermore, over a power source line VDD_cnt, the power source is supplied to the counters 41-1 to 41-10. Moreover, the power source from the same power supply is supplied to the power source line VDD_Lat1, the power source line VDD_Lat2, and the power source line VDD_cnt.

Output signals, output by the first pixels 2-1 arranged in the same column, and the ramp signal, output by the ramp wave generator 9, are input to the comparators 3-1, 3-3, 3-5, 3-7, and 3-9. The output signals, output by the second pixels 2-2 arranged in the same column, and the ramp signal, output by the ramp wave generator 9 are input to the comparators 3-2, 3-4, 3-6, 3-8, and 3-10. The comparators 3-1 to 3-10 output signals that control the low order latches 51-1 to 51-10 arranged in the same column, based on the signal that is input.

Over a phase shift pulse supply line CK0, the phase shift pulse φCK0, output by the phase shift pulse generation unit 10 is supplied to the first latch units Lat5111, Lat5131, Lat5151, Lat5171, and Lat5191. Furthermore, over a phase shift pulse supply line CK1, the phase shift pulse φCK1, output by the phase shift pulse generation unit 10 is supplied to the first latch units Lat5121, Lat5141, Lat5161, Lat5181, and Lat5201. Furthermore, over the phase shift pulse supply line CK1, the phase shift pulse φCK1, output by the phase shift pulse generation unit 10 is supplied to the second latch units Lat5112, Lat5132, Lat5152, Lat5172, and Lat5192. Furthermore, over a phase shift pulse supply line CK2, the phase shift pulse φCK2, output by the phase shift pulse generation unit 10 is supplied to the second latch units Lat5122, Lat5142, Lat5162, Lat5182, and Lat5202.

Thus, the output signals from the comparators 3-1, 3-3, 3-5, 3-7, and 3-9, arranged in the same column, and the phase shift pulse φCK0, output by the phase shift pulse generator 10, are input to the first latch units Lat5111, Lat5131, Lat5151, Lat5171, and Lat5191. The output signals from the comparators 3-2, 3-4, 3-6, 3-8, and 3-10, arranged in the same column, and the phase shift pulse φCK1, output by the phase shift pulse generator 10, are input to the first latch units Lat5121, Lat5141, Lat5161, Lat5181, and Lat5201. The output signals from the comparators 3-1, 3-3, 3-5, 3-7, and 3-9, arranged in the same column, and the phase shift pulse φCK1, output by the phase shift pulse generator 10, are input to the second latch units Lat5112, Lat5132, Lat5152, Lat5172, and Lat5192. The output signals from the comparators 3-2, 3-4, 3-6, 3-8, and 3-10, arranged in the same column, and the phase shift pulse φCK2, output by the phase shift pulse generator 10, are input to the second latch units Lat5122, Lat5142, Lat5162, Lat5182, and Lat5202.

With this configuration, the low order latches 51-1, 51-3, 51-5, 51-7, and 51-9 output a pulse φCK0' with respect to the counters 41-1, 41-3, 41-5, 41-7, and 41-9, arranged in the same column, in response to the phase shift pulse φCK0, output by the phase shift pulse generator 10. Furthermore, the low order latches 51-2, 51-4, 51-6, 51-8, and 51-10 output a pulse φCK1' with respect to the counters 41-2, 41-4, 41-6, 41-8, and 41-10, arranged in the same column, in response to the phase shift pulse φCK1, output by the phase shift pulse generator 10.

The power source is supplied to the counters 41-1 to 41-10 over the power source line VDD_cnt. The pulses φCK0', output by the low order latches 51-1, 51-3, 51-5, 51-7, and 51-9 arranged in the same column, are input to the counters 41-1, 41-3, 41-5, 41-7, and 41-9. The pulses φCK1', output by the low order latches 51-2, 51-4, 51-6, 51-8, and 51-10 arranged in the same column, are input to the counters 41-2, 41-4, 41-6, 41-8, and 41-10.

Next, operation of the imaging device 20 is described. First, the vertical drive unit 6 causes a pixel selection signal φSL to be at a high level. Thus, the pixels 2 in the first row are selected from among the pixels 2 included in the pixel unit 1, and the pixel signals, output by the selected pixels 2 in the first row are input to the A/D conversion circuit (the comparators 3-1 to 3-10), arranged in the same column as each pixel 2. Moreover, two signals, a reset signal that is output when resetting a photoelectric converter included in the pixel 2, and an optical signal that the photoelectric converter included in the pixel 2 generates in response to an amount of incident light, are input as the pixel signal to the A/D conversion circuit.

Subsequently, the A/D conversion circuit digitally converts the reset signal and the optical signal that are input from the pixel 2, and generates the digital image signal in which the reset signal is subtracted from the digitally-converted optical signal and in which a noise at the time of the resetting is suppressed. Furthermore, the A/D conversion circuit outputs the digital pixel signal with respect to the latch units 5-1 to 5-10 arranged in the same column, based on a control signal input from the control unit 8. The latch units 5-1 to 5-10 each maintain the digital pixel signal that is input.

Subsequently, the horizontal drive unit 7 sequentially causes horizontal selection signals φH to be at a high level. Thus, the digital pixel signals, maintained by the latch units 5-1 to 5-10, are sequentially output to the outside.

Next, operation of the A/D conversion circuit included in the A/D conversion unit 4 is described in detail. The pixel signals, output by the first pixels 2-1 or the second pixels 2-2 that is arranged in the same column, and the ramp signal, output by the ramp wave generator 9, which changes (increases or decreases) in voltage by being approximately synchronized with a logical state of the counter 41 are input to the comparators 3-1 to 3-10 included in the A/D conversion circuit. In a case where the pixel signal is input, the comparators 3-1 to 3-10 start making a comparison between the pixel signal and the ramp signal that are input. At the same time, the counters 41-1 to 41-10 start counting.

Furthermore, at the same time that the counters 41-1 to 41-10 start counting, the phase shift pulse generator 10 inputs the phase shift pulses φCK0, φCK1, φCK2, and φCK3, which are used to determine a low order logical state, with respect to the low order latches 51-1 to 51-10.

Subsequently, the low order latches 51-1, 51-3, 51-5, 51-7, and 51-9 output the pulse φCK0' with respect to the counters 41-1, 41-3, 41-5, 41-7, and 41-9, arranged in the same column, in response to the phase shift pulse φCK0, output by the phase shift pulse generator 10. Furthermore, the low order latches 51-2, 51-4, 51-6, 51-8, and 51-10 output the pulse φCK1' with respect to the counters 41-2, 41-4, 41-6, 41-8, and 41-10, arranged in the same column, in response to the phase shift pulse φCK1, output by the phase shift pulse generator 10.

Subsequently, when a magnitude relationship between the pixel signal and the ramp signal, which are input, is interchanged (is a predetermined relationship), the comparators 3-1, 3-3, 3-5, 3-7, and 3-9 reverse a value that is output with respect to the low order latches 51-1, 51-3, 51-5, 51-7, and 51-9. In a case where the values, input from the comparators 3-1, 3-3, 3-5, 3-7, and 3-9, are reversed, the low order latches 51-1, 51-3, 51-5, 51-7, and 51-9 (a first pixel latch group) maintain an input logical state. In a case where the low order latches 51-1, 51-3, 51-5, 51-7, and 51-9 maintain the input logical states, the counters 41-1, 41-3, 41-5, 41-7, and 41-9 (a first counter) maintain the count values.

Similarly, when the magnitude relationship between the pixel signal and the ramp signal, which are input, is interchanged, the comparators 3-2, 3-4, 3-6, 3-8, and 3-10 reverse the values that are output with respect to the low order latches 51-2, 51-4, 51-6, 51-8, and 51-10. In a case where the values, input from the comparators 3-2, 3-4, 3-6, 3-8, and 3-10 are reversed, the low order latches 51-2, 51-4, 51-6, 51-8, and 51-10 (a second pixel latch group) maintain the input logical state. In a case where the low order latches 51-2, 51-4, 51-6, 51-8, and 51-10 maintain the input logical states, the counters 41-2, 41-4, 41-6, 41-8, and 41-10 (a second counter) maintain the count values.

At this time, the ramp signals, input to the comparators 3-1 to 3-10, a timing when the low order latches 51-1 to 51-10 maintain the input logical state, and a timing when the counters 41-1 to 41-10 maintain the count value, are approximately synchronized with each other. Therefore, the pixel signals that are targets for an A/D conversion are A/D-converted into the values that are maintained in the low order latches 51-1 to 51-10 and the counters 41-1 to 41-10.

Moreover, in the example described above, the phase shift pulse generator 10 outputs four types of phase shift pulses, which are different in phase, which are the phase shift pulse φCK0 to the phase shift pulse φCK3 (the first to fourth phase shift pulses), but is not limited to this. For example, the phase shift pulse generator 10 may output more than two types of phase shift pulses, which are different in phase, which are the first phase shift pulse to the n-th phase shift pulse (an n is a natural number greater than 1). Furthermore, in this case, the imaging device 20 includes the first pixel latch group, the second pixel latch group, the first power source line to the n-th power source line, and the first phase shift pulse supply line to the n-th phase shift pulse supply line. The first pixel latch group includes an alignment in row a plurality of first latches each of which includes an alignment in column of first to n-th first latch units in the order of the first to the n-th. The second pixel latch group includes an alignment in row a plurality of second latches each of which includes an alignment in column of first to n-th second latch units in the order of the first to the n-th.

Next, operation of the low order latches 51-1 to 51-10 and operation of the counters 41-1 to 41-10 that are included in the A/D conversion circuit is described in detail. The phase shift pulse φCK0, output by the phase shift pulse generator 10, is input to the first latch units Lat5111, Lat5131, Lat5151, Lat5171, and Lat5191 included in the low order latches 51-1, 51-3, 51-5, 51-7, and 51-9. Furthermore, the phase shift pulse φCK1, output by the phase shift pulse generator 10, is input to the first latch units Lat5121, Lat5141, Lat5161, Lat5181, and Lat5201 included in the low order latches 51-2, 51-4, 51-6, 51-8, and 51-10. Furthermore, there is a deviation of π/8 in phase between the phase shift pulse φCK0 and the phase shift pulse φCK1.

For this reason, there is a deviation of approximately π/8 of a phase shift pulse period between a timing when the phase shift pulse that is input changes (changes from high to low, or from low to high) in the first latch units Lat5111, Lat5131, Lat5151, Lat5171, and Lat5191, and a timing when the phase shift pulse that is input changes (changes from high to low or from low to high) in the first latch units Lat 5121, Lat5141, Lat5161, Lat5181, and Lat5201. Therefore, an electric current that flows through the power source line VDD_Lat1 becomes an electric current that flows through the A/D conversion circuits of which the number is half of the number of the A/D conversion circuits included in the A/D conversion unit 4.

Similarly, the phase shift pulse φCK1, output by the phase shift pulse generator 10, is input to the second latch units Lat5112, Lat5132 Lat5152, Lat5172, and Lat5192 included in the low order latches 51-1, 51-3, 51-5, 51-7, and 51-9. Furthermore, the phase shift pulse φCK2, output by the phase shift pulse generator 10, is input to the second latch units Lat5122, Lat5142, Lat5162, Lat5182, and Lat5202 included in the low order latches 51-2, 51-4, 51-6, 51-8, and 51-10. Furthermore, there is a deviation of π/8 in phase between the phase shift pulse φCK1 and the phase shift pulse φCK2.

For this reason, there is a deviation of approximately π/8 of the phase shift pulse period between the timing when the phase shift pulse that is input changes (changes from high to low, or from low to high) in the second latch units Lat5112 Lat5132, Lat5152, Lat5172, and Lat5192, and the timing when the phase shift pulse that is input changes (changes from high to low or from low to high) in the second latch units Lat 5122, Lat5142, Lat5162, Lat5182, and Lat5202. Therefore, the electric current that flows through the power source line VDD_Lat2 becomes the electric current that flows through the A/D conversion circuits of which the number is half of the number of the A/D conversion circuits included in the A/D conversion unit 4.

Furthermore, the pulses φCK0', output by the low order latches 51-1, 51-3, 51-5, 51-7, and 51-9, are input, as the counter pulses, to the counters 41-1, 41-3, 41-5, 41-7, and 41-9. Furthermore, the pulses φCK1', output by the low order latches 51-2, 51-4, 51-6, 51-8, and 51-10, are input as the counter pulses, to the counters 41-2, 41-4, 41-6, 41-8, and 41-10.

For this reason, there is a deviation of approximately π/8 of a counter pulse period between a timing when the counter pulse that is input changes (changes from high to low, or from low to high) in the counters 41-1, 41-3, 41-5, 41-7, and 41-9, and a timing when the counter pulses that is input changes (changes from high to low or from low to high) in the counters 41-2, 41-4, 41-6, 41-8, and 41-10. Therefore, an electric current that flows through the power source line VDD_cnt becomes an electric current that flows through the counters 41-1 to 41-10 of which the number is half of the number of the counters 41-1 to 41-10 included in the A/D conversion unit 4.

As described above, according to the first embodiment, the timings of the changes in the pulses, which are input to the latch units Lat arranged in parallel with the horizontal direction and the counters 41-1 to 41-10 differ from one column to another. Thus, also the timings when the electric current consumed in the latch units Lat and the counters 41-1 to 41-10 flows differ from one column to another. Therefore, the change in the electric current that flows through the power source lines VDD_Lat1, VDD_Lat2, and VDD_cnt and the GND may be suppressed to half of the amount or less.

Therefore, according to the first embodiment, also in a case where the A/D conversion circuit is installed in every column, the fluctuations in the power source and the GND due to the operation of the A/D conversion circuit in each column may be decreased and the fluctuation in the output value of each A/D conversion circuit may be prevented.

Moreover, in the example described above, the phase shift pulses, input to the latch units Lat included in the low order latches 51-1 to 51-10, are described as having configurations that differ in every column, but is not limited to this. For example, the phase shift pulses, input to the latch units Lat included in the low order latches 51-1 to 51-10, may have configurations that differ in every multiple column.

Furthermore, in the example described above, the counter pulses, input to the counters 41-1 to 41-10, are described as the output pulses φCK0' and φCK1' of the low order latches 51-1 to 51-10, but may also be the phase shift pulses φCK0 and φCK1, output by the phase shift pulse generator 10.

Second Embodiment

Next, a second embodiment according to the present invention is described. The imaging device according to the second embodiment includes the same components as the imaging device 20 according to the first embodiment. The imaging device according to the second embodiment and the imaging device 20 according to the first embodiment differ in latch units Lat that supply phase shift pulses φCK0 to φCK3 generated by a phase shift pulse generator 10.

Moreover, among pixels 2 that are arranged in a pixel unit 1, the pixels 2 that are arranged in the first column, the fifth column, and the ninth column from left are defined as first pixels 2-1. Furthermore, the pixels 2 that are arranged in the second column, the sixth column, and the tenth column from left are defined as second pixels 2-2. Furthermore, the pixels 2 that are arranged in the third column and the seventh column from left are defined as third pixels. Furthermore, the pixels 2 that are arranged in the fourth column and the eighth column from left are defined as fourth pixels 2. Furthermore, analog signals output by the first pixels 2-1 are defined as first pixel signals, analog signals output by the second pixels 2-2 as second pixel signals, analog signals output by the third pixels 2 as third pixel signals, and analog signals output by the fourth pixels 2 as fourth pixel signals.

Figure 3:
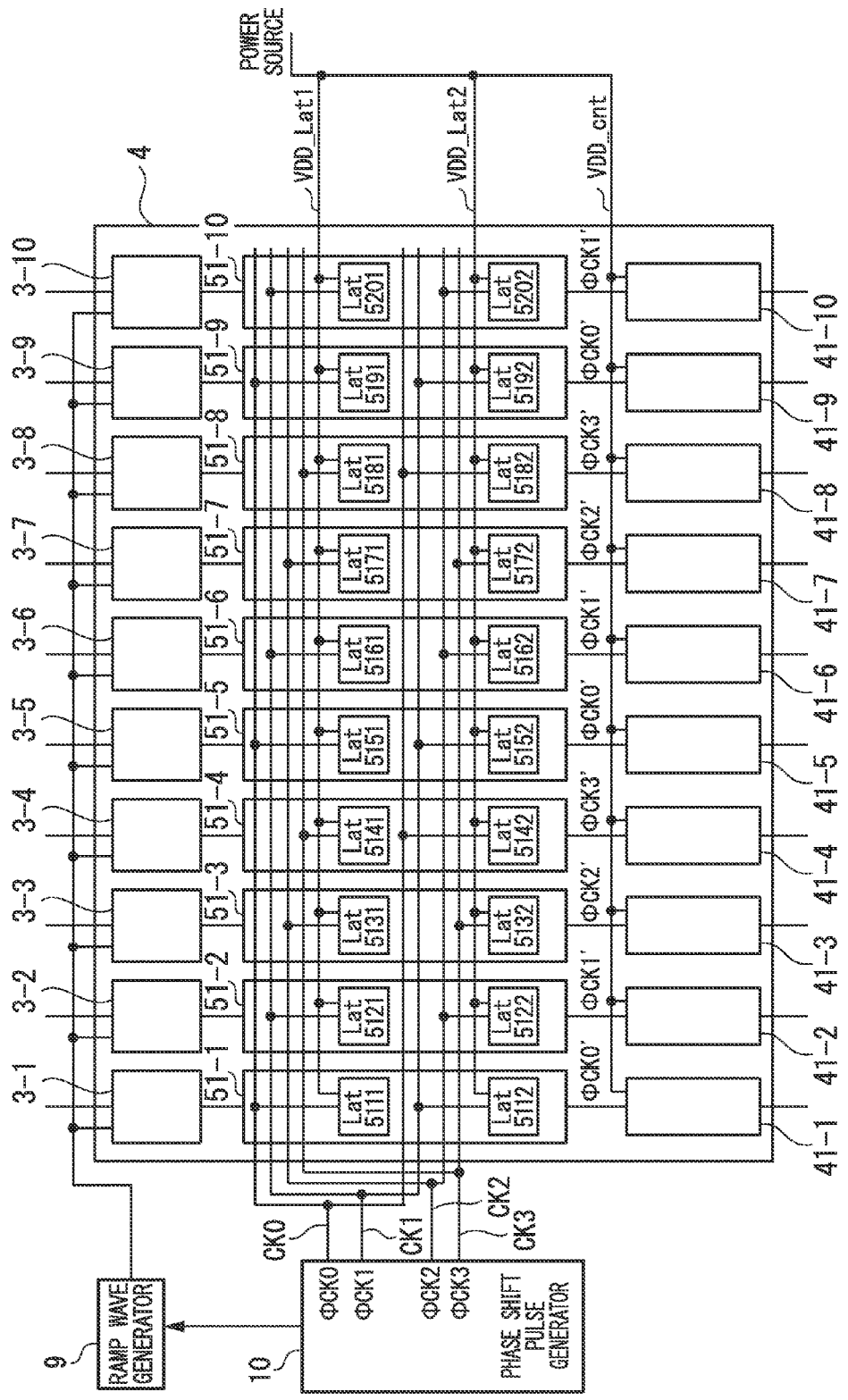
FIG. 3 is a block diagram illustrating configurations of an A/D conversion unit, a phase shift pulse generator and a ramp wave generator according to a second embodiment of the present invention.

FIG. 3 is a block diagram illustrating configurations of an A/D conversion unit 4, a phase shift pulse generator 10 and a ramp wave generator 9 that are included in the imaging device according to the second embodiment. Moreover, a configuration of each component is the same as that of each component according to the first embodiment.

Furthermore, over a power source line VDD Lat1, the power source is supplied to first latch units Lat5111, Lat5121, Lat5131, Lat5141, Lat5151, Lat5161, Lat5171, Lat5181, Lat5191, and Lat5201. Furthermore, over a power source line VDD_Lat2, the power source is supplied to second latch units Lat5112, Lat5122, Lat5132, Lat5142, Lat5152, Lat5162, Lat5172, Lat5182, Lat5192, and Lat5202. Furthermore, over a power source line VDD cnt, the power source is supplied to counters 41-1 to 41-10. Moreover, the power source from the same power supply is supplied to the power source line VDD_Lat1, the power source line VDD_Lat2, and the power source line VDD_cnt.

Output signals, output by the first pixels 2-1 arranged in the same column, and a ramp signal, output by a ramp wave generator 9 are input to comparators 3-1, 3-5 and 3-9. Output signals, output by the second pixels 2-2 arranged in the same column, and the ramp signal, output by the ramp wave generator 9 are input to comparators 3-2, 3-6 and 3-10. Output signals, output by the third pixels 2 arranged in the same column, and the ramp signal, output by the ramp wave generator 9 are input to comparators 3-3 and 3-7. Output signals, output by the fourth pixels 2 arranged in the same column, and the ramp signal, output by the ramp wave generator 9 are input to comparators 3-4 and 3-8. The comparators 3-1 to 3-10 output a signal that controls low order latches 51-1 to 51-10 arranged in the same column, based on the signal that is input.

Over a phase shift pulse supply line CK0, a phase shift pulse φCK0, output by a phase shift pulse generation unit 10 is supplied to the first latch units Lat5111, Lat5151, and Lat5191. Furthermore, over a phase shift pulse supply line CK1, a phase shift pulse φCK1, output by the phase shift pulse generation unit 10 is supplied to the first latch units Lat5121, Lat5161, and Lat5201. Furthermore, over a phase shift pulse supply line φCK2, a phase shift pulse φCK2, output by the phase shift pulse generation unit 10 is supplied to the first latch units Lat5131 and Lat5171. Furthermore, over a phase shift pulse supply line CK3, a phase shift pulse φCK3, output by the phase shift pulse generation unit 10 is supplied to the first latch units Lat5141 and Lat5181.

Furthermore, over the phase shift pulse supply line CK1, the phase shift pulse φCK1, output by the phase shift pulse generation unit 10 is supplied to the second latch units Lat5112, Lat5152, and Lat5192. Furthermore, over the phase shift pulse supply line CK2, the phase shift pulse φCK2, output by the phase shift pulse generation unit 10 is supplied to the second latch units Lat5122, Lat5162, and Lat5202. Furthermore, over the phase shift pulse supply line CK3, the phase shift pulse φCK3, output by the phase shift pulse generation unit 10 is supplied to the second latch units Lat5132 and Lat5172. Furthermore, over the phase shift pulse supply line CK0, the phase shift pulse φCK0, output by the phase shift pulse generation unit 10, is supplied to the second latch units Lat5142 and Lat5182.

Thus, the output signals from the comparators 3-1, 3-5, and 3-9, arranged in the same column, and the phase shift pulse φCK0, output by the phase shift pulse generator 10, are input to the first latch units Lat5111 Lat5151, and Lat5191. Thus, the output signals from the comparators 3-2, 3-6, and 3-10, arranged in the same column, and the phase shift pulse φCK1, output by the phase shift pulse generator 10, are input to the first latch units Lat5121, Lat5161, and Lat5201. The output signals from the comparators 3-3 and 3-7, arranged in the same column, and the phase shift pulse φCK2, output by the phase shift pulse generator 10, are input to the first latch units Lat5131 and Lat5171. The output signals from the comparators 3-4 and 3-8, arranged in the same column, and the phase shift pulse φCK3, output by the phase shift pulse generator 10, are input to the first latch units Lat5141 and Lat5181.

Thus, the output signals from the comparators 3-1, 3-5, and 3-9, arranged in the same column, and the phase shift pulse φCK1, output by the phase shift pulse generator 10, are input to the second latch units Lat5112, Lat5152, and Lat5192. The output signals from the comparators 3-2, 3-6, and 3-10, arranged in the same column, and the phase shift pulse φCK2, output by the phase shift pulse generator 10, are input to the second latch units Lat5122, Lat5162, and Lat5202. The output signals from the comparators 3-3 and 3-7, arranged in the same column, and the phase shift pulse φCK3, output by the phase shift pulse generator 10, are input to the second latch units Lat5132 and Lat5172. The output signals from the comparators 3-4 and 3-8, arranged in the same column, and the phase shift pulse φCK0, output by the phase shift pulse generator 10, are input to the second latch units Lat5142 and Lat5182.

With this configuration, the low order latches 51-1, 51-5, and 51-9 output a pulse φCK0' with respect to the counters 41-1, 41-5, and 41-9, arranged in the same column, in response to the phase shift pulse φCK0, output by the phase shift pulse generator 10. Furthermore, the low order latches 51-2, 51-6, and 51-10 output a pulse φCK1' with respect to the counters 41-2, 41-6, and 41-10, arranged in the same column, in response to the phase shift pulse φCK1, output by the phase shift pulse generator 10. Furthermore, the low order latches 51-3 and 51-7 output a pulse φCK2' with respect to the counters 41-3, and 41-7, arranged in the same column, in response to the phase shift pulse φCK2, output by the phase shift pulse generator 10. Furthermore, the low order latches 51-4 and 51-8 output a pulse φCK3' with respect to the counters 41-4, and 41-8, arranged in the same column, in response to the phase shift pulse φCK3, output by the phase shift pulse generator 10.

The power source is supplied to the counters 41-1 to 41-10 over the power source line VDD_cnt. The pulses φCK0', output by the low order latches 51-1, 51-5, and 51-9 arranged in the same column, are input to the counters 41-1, 41-5, and 41-9. The pulses φCK1', output by the low order latches 51-2, 51-6, and 51-10 arranged in the same column, are input to the counters 41-2, 41-6, and 41-10. The pulses φCK2', output by the low order latches 51-3, and 51-7 arranged in the same column, are input to the counters 41-3 and 41-7. The pulses φCK3', output by the low order latches 51-4, and 51-8 arranged in the same column, are input to the counters 41-4 and 41-8.

Operation of the imaging device according to the second embodiment is the same as the operation of the imaging device 20 according to the first embodiment and therefore a description thereof is omitted. Next, operation of an A/D conversion circuit included in the A/D conversion unit 4 is described in detail. The pixel signals, output by the first to fourth pixels 2 that are arranged in the same column, and the ramp signal, output by the ramp wave generator 9, which changes (increases or decreases) in voltage by being approximately synchronized with a logical state of a counter 41 are input to the comparators 3-1 to 3-10 included in the A/D conversion circuit. In a case where the pixel signal is input, the comparators 3-1 to 3-10 starts making a comparison between the pixel signal and the ramp signal that are input. At the same time, the counters 41-1 to 41-10 start counting.

Furthermore, at the same time that the counters 41-1 to 41-10 start counting, the phase shift pulse generator 10 inputs the phase shift pulses φCK0, φCK1, φCK2, and φCK3, which are used to determine a low order logical state, with respect to the low order latches 51-1 to 51-10.

Subsequently, the low order latches 51-1, 51-5, and 51-9 output a pulse φCK0' with respect to the counters 41-1, 41-5, and 41-9, arranged in the same column, in response to the phase shift pulse φCK0 output by the phase shift pulse generator 10. Furthermore, the low order latches 51-2, 51-6, and 51-10 output a pulse φCK1' with respect to the counters 41-2, 41-6, and 41-10, arranged in the same column, in response to the phase shift pulse φCK1 output by the phase shift pulse generator 10. Furthermore, the low order latches 51-3 and 51-7 output a pulse φCK2' with respect to the counters 41-3, and 41-7, arranged in the same column, in response to the phase shift pulse φCK2 output by the phase shift pulse generator 10. Furthermore, the low order latches 51-4 and 51-8 output a pulse φCK3' with respect to the counters 41-4, and 41-8, arranged in the same column, in response to the phase shift pulse φCK3 output by the phase shift pulse generator 10.

Subsequently, when a magnitude relationship between the pixel signal and the ramp signal, which are input, is interchanged (is a predetermined relationship), the comparators 3-1, 3-5, and 3-9 reverse a value that is output with respect to the low order latches 51-1, 51-5, and 51-9. In a case where the values, input from the comparators 3-1, 3-5, and 3-9 are reversed, the low order latches 51-1, 51-5, and 51-9 (a first pixel latch group) maintain an input logical state. In a case where the low order latches 51-1, 51-5, and 51-9 maintain the input logical states, the counters 41-1, 41-5, and 41-9 (a first counter) maintain the count values.

Similarly, when the magnitude relationship between the pixel signal and the ramp signal, which are input, is interchanged, the comparators 3-2, 3-6, and 3-10 reverse the values that are output with respect to the low order latches 51-2, 51-6, and 51-10. In a case where the values, input from the comparators 3-2, 3-6, and 3-10 are reversed, the low order latches 51-2, 51-6, and 51-10 (a second pixel latch group) maintain an input logical state. In a case where the low order latches 51-2, 51-6, and 51-10 maintain the input logical states, the counters 41-2, 41-6, and 41-10 (a second counter) maintain the count values.

Similarly, when the magnitude relationship between the pixel signal and the ramp signal, which are input, is interchanged, the comparators 3-3 and 3-7 reverse the values that are output with respect to the low order latches 51-3 and 51-7. In a case where the values, input from the comparators 3-3 and 3-7 are reversed, the low order latches 51-3, and 51-7 (a third pixel latch group) maintain input logical states. In a case where the low order latches 51-3 and 51-7 maintain the input logical states, the counters 41-3 and 41-7 (a third counter) maintain the count values.

Similarly, when the magnitude relationship between the pixel signal and the ramp signal, which are input, is interchanged, the comparators 3-4 and 3-8 reverse the values that are output with respect to the low order latches 51-4 and 51-8. In a case where the values, input from the comparators 3-4 and 3-8 are reversed, the low order latches 51-4 and 51-8 (a fourth pixel latch group) maintain the input logical state. In a case where the low order latches 51-4 and 51-8 maintain the input logical states, the counters 41-4 and 41-8 (a fourth counter) maintain the count values.

At this time, the ramp signals, input to the comparators 3-1 to 3-10, a timing when the low order latches 51-1 to 51-10 maintain the input logical state, and a timing when the counters 41-1 to 41-10 maintain the count value, are approximately synchronized with one another. Therefore, the pixel signals that are targets for an A/D conversion are A/D-converted into the values that are maintained in the low order latches 51-1 to 51-10 and the counters 41-1 to 41-10.

Figure 4:
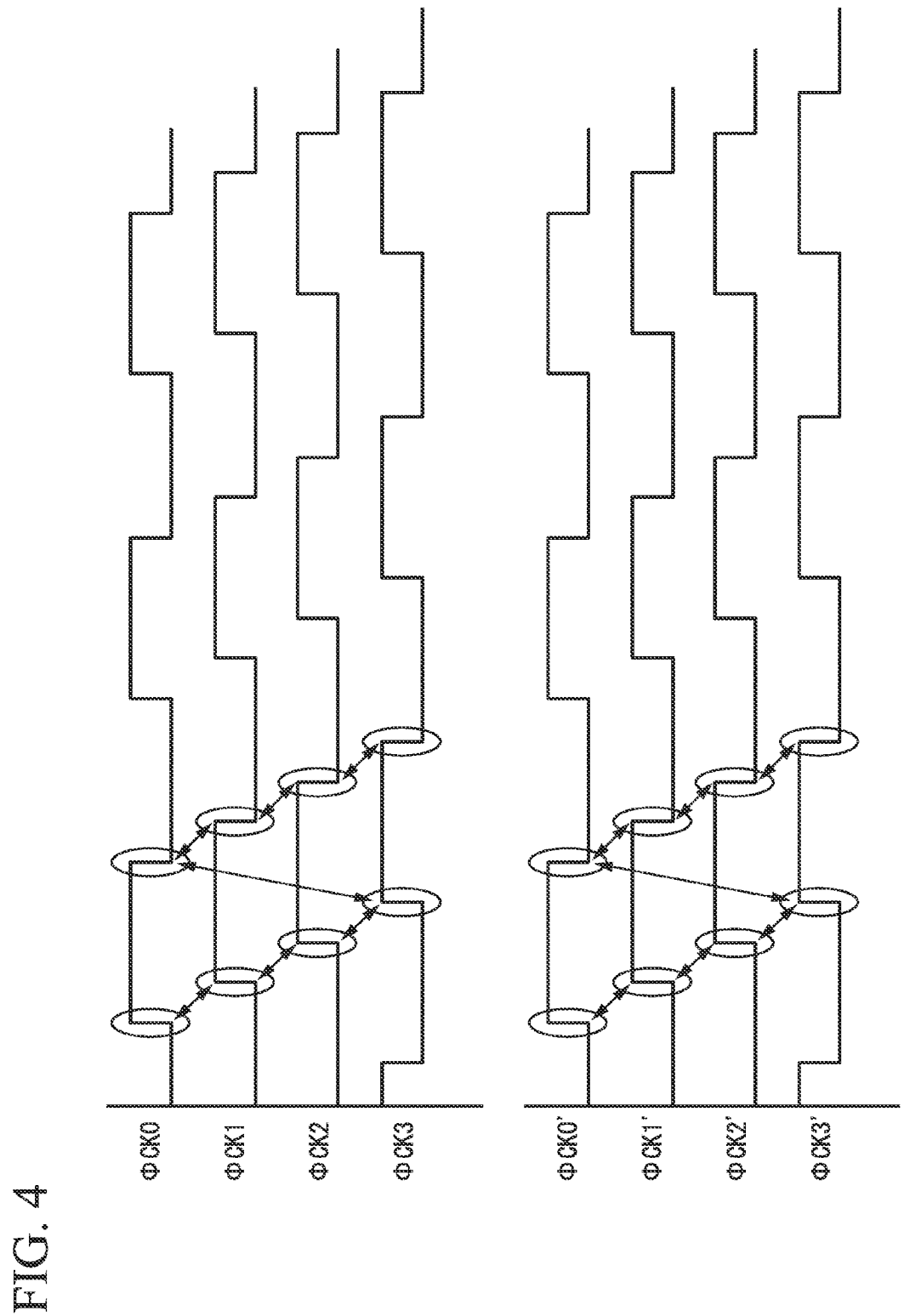
FIG. 4 is a timing chart illustrating a timing when phase shift pulses are output by the phase shift pulse generator and a timing when pulses are output by low order latches, according to the second embodiment of the present invention.
Figure 5:
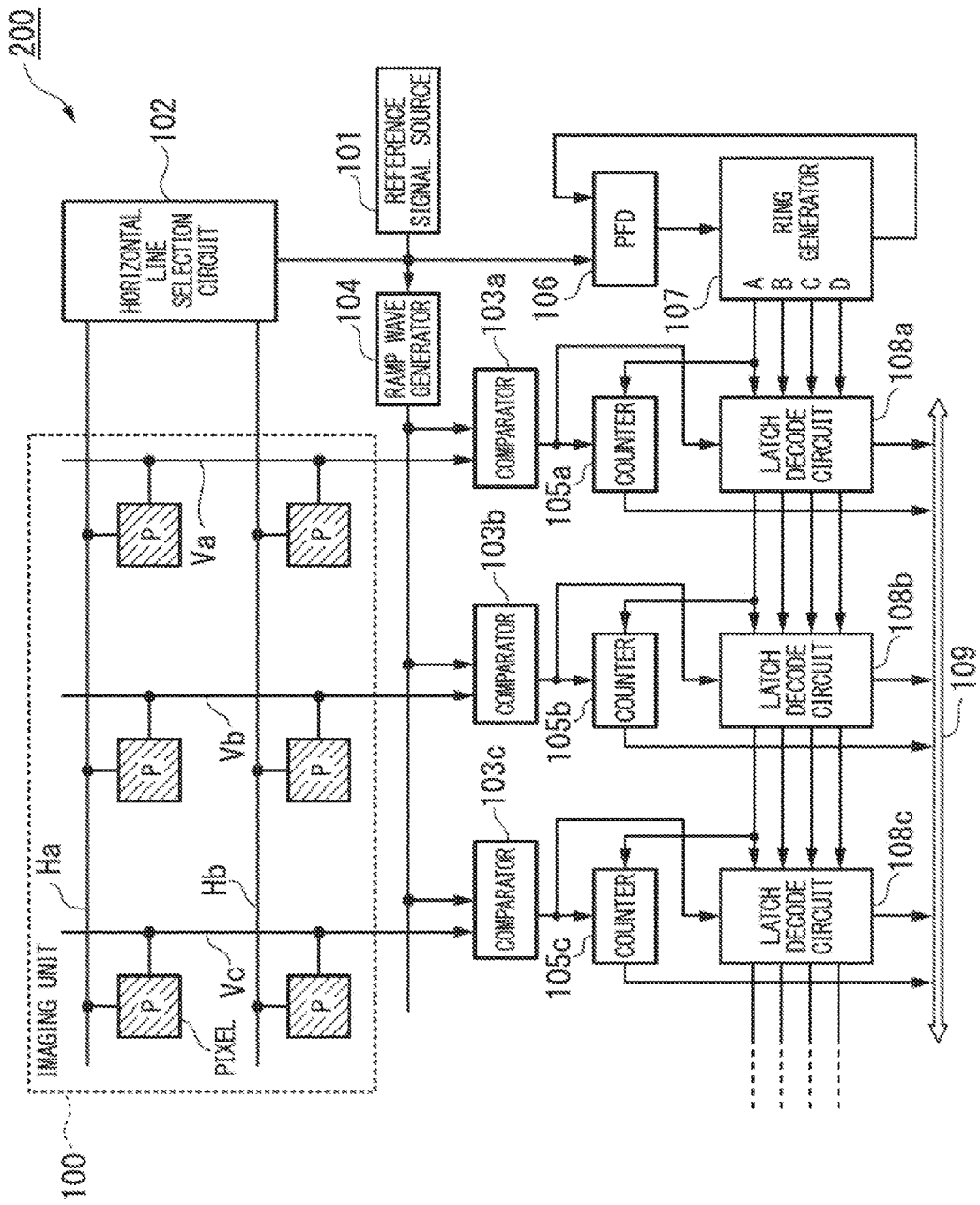
FIG. 5 is a block diagram illustrating an outline of a configuration of the imaging device that has a single slope A/D conversion circuit, known in the related art.
Figure 6:
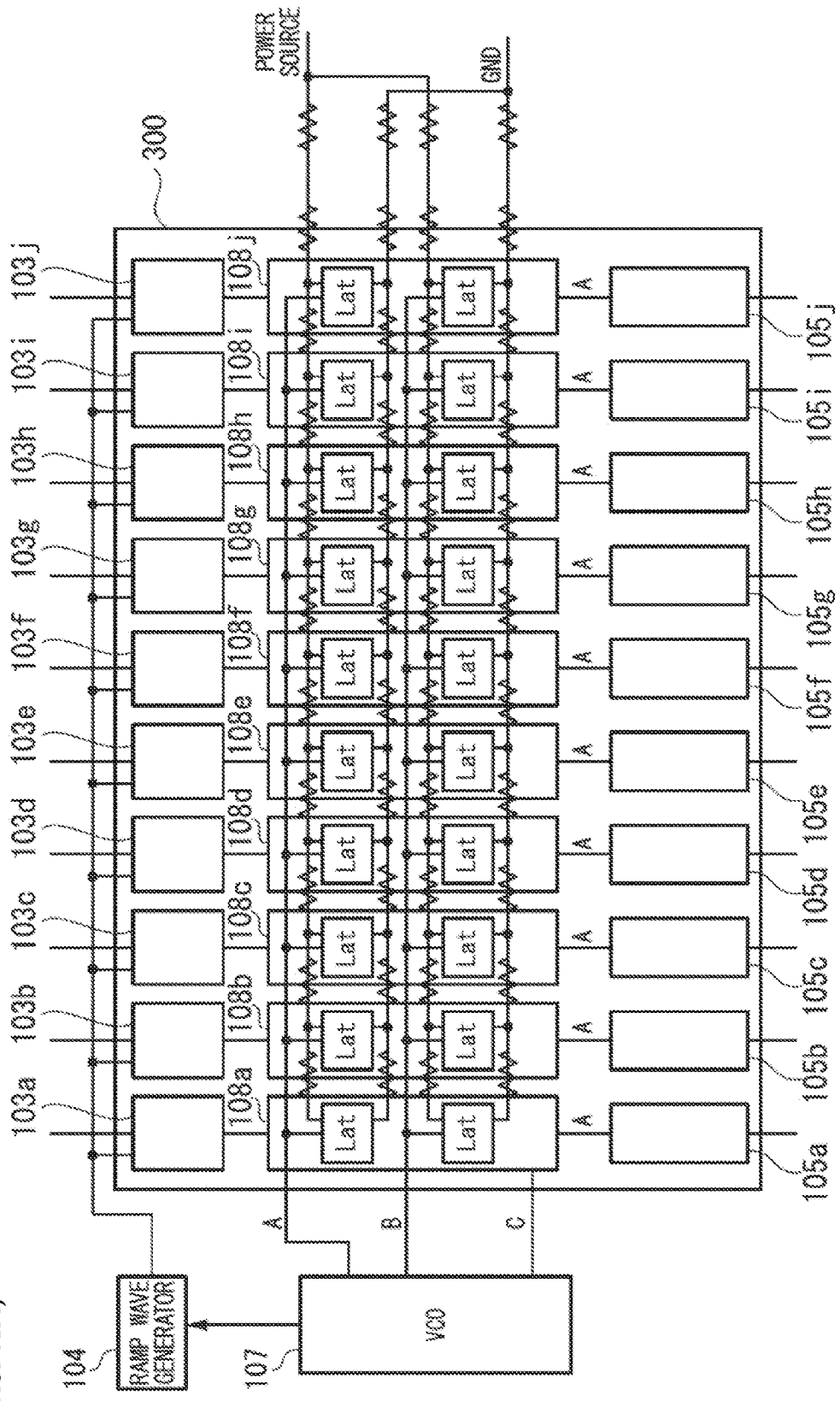
FIG. 6 is a block diagram illustrating an outline of the configuration of the ND conversion unit that is equipped with the single slope A/D conversion circuit that is known in the related art.

Next, operation of the low order latches 51-1 to 51-10 and operation of the counter 41-1 to 41-10 that are included in the A/D conversion circuit is described in detail. FIG. 4 is a timing chart illustrating a timing when the phase shift pulses φCK0, φCK1, φCK2, and φCK3 are output by the phase shift pulse generator 10 according to the second embodiment and a timing when the pulse φCK0', φCK1', φCK2', and φCK3' are output by the low order latches 51-1 to 51-10.

Furthermore, in the example illustrated in FIG. 4, there is a deviation of $\pi/8$ in phase between the phase shift pulse φCK0 and the phase shift pulse φCK1. Furthermore, there is a deviation of $\pi/8$ in phase between the phase shift pulse φCK1 and the phase shift pulse φCK2. Furthermore, there is a deviation of $\pi/8$ in phase between the phase shift pulse φCK2 and the phase shift pulse φCK3. Furthermore, there is a deviation of $\pi/8$ in phase between the phase shift pulse φCK3 and the phase shift pulse φCK0.

Furthermore, in the example illustrated in FIG. 4, there is a deviation of $\pi/8$ in phase between the pulse φCK0' and the pulse φCK1'. Furthermore, there is a deviation of $\pi/8$ in phase between the pulse φCK1' and the pulse φCK2'. Furthermore, there is a deviation of $\pi/8$ in phase between the pulse φCK2' and the pulse φCK3'. Furthermore, there is a deviation of $\pi/8$ in phase between the pulse φCK3' and the pulse φCK0'.

The phase shift pulse φCK0, output by the phase shift pulse generator 10, is input to the first latch units Lat5111, Lat5151, and Lat5191 included in the low order latches 51-1, 51-5, and 51-9. Furthermore, the phase shift pulse φCK1, output by the phase shift pulse generator 10, is input to the first latch units Lat5121 Lat5161, and Lat5201 included in the low order latches 51-2, 51-6, and 51-10. Furthermore, the phase shift pulse φCK2, output by the phase shift pulse generator 10, is input to the first latch units Lat5131 and Lat5171 included in the low order latches 51-3, and 51-7. Furthermore, the phase shift pulse φCK3, output by the phase shift pulse generator 10, is input to the first latch units Lat5141 and Lat5181 included in the low order latches 51-4, and 51-8.

Furthermore, as illustrated in FIG. 4, there are deviations of $\pi/8$ in phase between the phase shift pulses φCK0, φCK1, φCK2, and φCK3, respectively. For this reason, there are deviations of approximately $\pi/8$ of a phase shift pulse period between the timing when the phase shift pulse that is input changes (changes from high to low or from low to high) in the first latch units Lat5111, Lat5151 and Lat5191, the timing when the phase shift pulse that is input changes (changes from high to low or from low to high) in the first latch units Lat5121, Lat5161 and Lat5201, the timing when the phase shift pulse that is input changes (changes from high to low or from low to high) in the first latch units Lat5131 and Lat5171, and the timing when the phase shift pulse that is input changes (changes from high to low or from low to high) in the first latch units Lat5141 and Lat5181, respectively. Therefore, an electric current that flows through the power source line VDD_Lat1 becomes an electric current that flows through the A/D conversion circuits of which the number is one fourth of the number of the A/D conversion circuits included in the A/D conversion unit 4.

Similarly, the phase shift pulse φCK1, output by the phase shift pulse generator 10, is input to the second latch units Lat5112, Lat5152, and Lat5192 included in the low order latches 51-1, 51-5, and 51-9. Furthermore, the phase shift pulse φCK2, output by the phase shift pulse generator 10, is input to the second latch units Lat5122, Lat5162, and Lat5202 included in the low order latches 51-2, 51-6, and 51-10. Furthermore, the phase shift pulse φCK3, output by the phase shift pulse generator 10, is input to the second latch units Lat5132 and Lat5172 included in the low order latches 51-3 and 51-7. Furthermore, the phase shift pulse φCK0, output by the phase shift pulse generator 10, is input to the second latch units Lat5142 and Lat5182 included in the low order latches 51-4, and 51-8.

For this reason, there are deviations of approximately $\pi/8$ of a phase shift pulse period between the timing when the phase shift pulse that is input changes (changes from high to low or from low to high) in the second latch units Lat5112, Lat5152 and Lat5192, the timing when the phase shift pulse that is input changes (changes from high to low or from low to high) in the second latch units Lat5122, Lat5162 and Lat5202, the timing when the phase shift pulse that is input changes (changes from high to low or from low to high) in the second latch units Lat5132 and Lat5172, and the timing when the phase shift pulse that is input changes (changes from high to low or from low to high) in the second latch units Lat5142 and Lat5182, respectively. Therefore, an electric current that flows through the power source line VDD_Lat2 becomes an electric current that flows through the A/D conversion circuits of which the number is one fourth of the number of the A/D conversion circuits included in the A/D conversion unit 4.

Furthermore, the pulses φCK0', output by the low order latches 51-1, 51-5, and 51-9, are input, as the counter pulses, to the counters 41-1, 41-5, and 41-9. Furthermore, the pulses φCK1', output by the low order latches 51-2, 51-6, and 51-10, are input, as the counter pulses, to the counters 41-2, 41-6, and 41-10. Furthermore, the pulses φCK2', output by the low order latches 51-3 and 51-7, are input, as the counter pulses, to the counters 41-3 and 41-7. Furthermore, the pulses φCK3', output by the low order latches 51-4 and 51-8, are input, as the counter pulses, to the counters 41-4 and 41-8.

For this reason, as illustrated in FIG. 4, there are deviations of approximately π/8 of a counter pulse period between the timing when the counter pulse that is input changes (changes from high to low or from low to high) in the counters 41-1, 41-5 and 41-9, the timing when the counter pulse that is input changes (changes from high to low or from low to high) in the counters 41-2, 41-6 and 41-10, the timing when the counter pulse that is input changes (changes from high to low or from low to high) in the counters 41-3 and 41-7, and the timing when the counter pulse that is input changes (changes from high to low or from low to high) in the counters values 41-4 and 41-8, respectively. Therefore, the electric current that flows through the power source line VDD_cnt becomes an electric current that flows through the counters 41-1 to 41-10 of which the number is one fourth of the number of the counters 41-1 to 41-10 included in the A/D conversion unit 4.

As described above, according to the second embodiment, the timings of the changes in the pulses, which are input to the latch units Lat arranged in parallel in the horizontal direction and the counters 41-1 to 41-10 differ from one column to another. Thus, the timings when the electric current consumed in the latch units Lat and the counters 41-1 to 41-10 flows differ from one column to another as well. Therefore, the change in the electric current that flows through the power source lines VDD_Lat1, VDD_Lat2, and VDD_cnt and the GND may be suppressed to one fourth or less.

Therefore, according to the second embodiment, also in a case where the A/D conversion circuit is installed in every column, the fluctuations in the power source and the GND due to operation of the A/D conversion circuit in each column may be decreased and the fluctuation in the output value of each A/D conversion circuit may be prevented.

Moreover, in the example described above, the phase shift pulses, input to the latch units Lat included in the low order latches 51-1 to 51-10, are described as having configurations that differ in every column, but is not limited to this. For example, the phase shift pulses, input to the latch units Lat included in the low order latches 51-1 to 51-10, may have a configuration that differ in every multiple column.

Furthermore, in the example described above, the counter pulses, input to the counters 41-1 to 41-10, are described as the output pluses φCK0' to φCK3' of the low order latches 51-1 to 51-10, but may also be the phase shift pulses φCK0 to φCK3 output by the phase shift pulse generator 10.

The embodiments according to the present invention are described above in detail referring to the drawings, but the specific configuration is not limited to the embodiments and includes a design and the like within a scope not deviating from the gist of the present invention. The present invention is only limited by the scope of the appended claims.

What is claimed is:

1. An imaging device comprising:
   a plurality of first pixels, each of which outputs a first pixel signal which depends on an incident physical quantity;
   a plurality of second pixels, each of which outputs a second pixel signal which depends on the incident physical quantity;
   a ramp wave generator that outputs a ramp signal that monotonously increases or monotonously decreases over time;
   a phase shift pulse generator that outputs first to n-th phase shift pulse signals which differ from one another in phase in response to an input pulse signal;
   a first pixel latch group that latches the first to n-th phase shift pulse signals when the first pixel signal and the ramp signal have a predetermined relationship and that includes an alignment in a row of a plurality of first latches each of which includes an alignment in column of first to n-th first latch units;
   a second pixel latch group that latches the first to n-th phase shift pulse signals when the second pixel signal and the ramp signal have the predetermined relationship and that includes an alignment in a row of a plurality of second latches each of which includes an alignment in column of first to n-th second latch units;
   first to n-th power source lines to supply a power source; and
   first to n-th phase shift pulse supply lines to supply the phase shift pulse signals,
   wherein the i-th power source line is to supply power to the i-th first latch units and the i-th second latch units,
   wherein the i-th phase shift pulse supply line is to supply the i-th phase shift pulse signal to the i-th first latch units and the j-th second latch units, and
   wherein n is a natural number greater than 1, i is a natural number equal to or greater than 1 and equal to or smaller than n, and j is a natural number equal to or greater than 1 and equal to or smaller than n, and different from i.

2. The imaging device according to claim 1, further comprising:
   a first counter that counts either of the first to n-th phase shift pulse signals;
   a first high order bit latch that maintains an output of the first counter when the first pixel signal and the ramp signal have a predetermined relationship;
   a second counter that counts either of the first to n-th phase shift pulse signals, and
   a second high order bit latch that maintains an output of the second counter when the second pixel signal and the ramp signal have the predetermined relationship,
   wherein the first counter and the second counter are powered by the same power source as that of the first to n-th power source lines.

3. The imaging device according to claim 1, further comprising:
   a plurality of third pixels, each of which outputs a third pixel signal that depends on an incident physical quantity;
   a plurality of fourth pixels, each of which outputs a fourth pixel signal that depends on an incident physical quantity;
   a third pixel latch group that latches the first to n-th phase shift pulse signals when the third pixel signal and the ramp signal have a predetermined relationship and that includes an alignment in a row of a plurality of third latches each of which includes an alignment in column of first to n-th third latch units, and a forth pixel latch group that latches the first to n-th phase shift pulse signals when the fourth pixel signal and the ramp signal have the predetermined relationship and that includes an alignment in a row of a plurality of fourth latches each of which includes an-alignmenht alignment in column of first to n-th fourth latch units, wherein the i-th power source line is to supply power to the i-th third latch unit and the i-th fourth latch unit, wherein the k-th phase shift pulse supply line is to supply the k-th phase shift pulse signal to the i-th third latch unit and the j-th fourth latch unit, and wherein k is a natural number equal to or greater than 1, equal to or smaller than n, and different from i and j.

4. The imaging device according to claim 1,
wherein j is different from i by 1.

* * * * *